Patented July 1, 1930

1,769,442

UNITED STATES PATENT OFFICE

FREDERICK OSCAR WARREN LOOMIS AND DANIEL MACKAY LOOMIS, OF MONTREAL, QUEBEC, CANADA

PROCESS OF MANUFACTURING BITUMINOUS ROAD MATERIAL

No Drawing. Application filed October 12, 1929, Serial No. 399,385, and in Canada November 10, 1928.

This invention relates to new and useful improvements in the process of manufacturing bituminous concrete for use in road and street surfacing and the like. The principal object of the invention is to provide a surfacing material of high quality, suitable for modern traffic requirements, at a comparatively low cost. A further object is to effect an improvement in the process of mixing bituminous concrete; to improve the quality of the product and to simplify the methods employed in production.

According to our invention, we obtain a bituminous concrete of high quality by using a clean, dry aggregate, covering it with a coating of oil and then mixing it with a predetermined amount of an asphalt emulsion. We then preferably add a suitable filler to toughen the bitumen and prefer to spray this filler into the mixer by means of steam or other compressed fluid. By means of this process, each piece of the aggregate is thickly coated with the bituminous material and the water in the emulsion is not absorbed by the aggregate, but is separated and allowed to drain off.

More specifically, our process of manufacturing bituminous concrete consists in cleaning the aggregate by any method which does not make it too hot, such as by-passing it through a revolving screen or drum heated by warm air. The warm air which may be supplied by a torch and fan dries the aggregate and blows off the dust leaving the stones clean and dry, but not hot. The clean, dry aggregate is delivered into a suitable mixer and a sufficient quantity of oil is then added to waterproof the aggregate and prevent it from absorbing the water from the emulsion, which is afterwards used. The oil employed may be kerosene, or a suitable oil having a flash point between 120 degrees and 150 degrees Fahrenheit.

A predetermined quantity of asphalt emulsion is then added to the waterproofed aggregate in the mixer. This asphalt emulsion should be an emulsion which will break down or separate when subjected to percussion, or to violent agitation or to vibration which takes place, for instance, in a mixer provided with revolving blades. Even if the mixer is not provided with blades or the like, a revolving drum having a quantity of aggregate which is thrown around in the mixer will produce sufficient percussion to separate or break down the emulsion, so that the bitumen will be released by the water and will completely cover the particles of the aggregate.

A suitable asphalt emulsion for our purpose may be made by heating the asphalt until it becomes liquid and then mixing it with water and agitating the mixture with a suitable emulsifying agent until the particles of asphalt remain in suspension and the mixture becomes a chocolate brown liquid. It is essential that the asphalt emulsion is one which will separate when subjected to percussion such as that above described in order that the particles of bitumen may be released to become distributed evenly upon or through the aggregate. The thickness of the bitumen which is deposited on each piece of aggregate is controlled by the amount of bituminous material put into the mixture.

As soon as the emulsion is broken down or separated by percussion due to the revolving of the mixer, we prefer to add a quantity of filler to the mix to toughen the bitumen. This filler may be limestone dust, hydrated lime, or any filler found useful in road practice, and is preferably sprayed into the mixer by means of a gun or nozzle, using steam as the propelling force. Other compressed fluids may be employed as well as any other suitable device which will spray the filler into the mass while it is in motion in the mixer to obtain an even distribution throughout the aggregate.

To further improve the uniformity of the mix and to enable the setting qualities to be controlled we finally employ a jet of steam, which is played into the interior of the mixer.

Our process differs radically from any of the methods now in use. We do not apply heat to our aggregate and we use a cold liquid asphalt emulsion, which will break down upon percussion and separate the bitumen from the water so that the separated bitumen may be evenly distributed over the particles of aggregate. This aggregate has already been waterproofed and protected from the water which forms part of the emulsion. As an example, if we use an emulsion composed of, say, 50% asphalt and 50% water, with a sufficient quantity of a suitable emulsifying agent and we add, say 8% of the emulsion to the mix, the 4% of bitumen will be evenly distributed over the particles of the aggregate. In this manner we obtain an even coating of bitumen on the particles of aggregate without adding a liquefier in the emulsion, or applying heat to the aggregate. Any size of aggregate may be used that good road building practice demands.

Having thus described our invention what we claim is:

1. A process of making road material which consists in covering an aggregate with an oil in sufficient quantity to waterproof the aggregate, mixing the so treated aggregate with an asphalt emulsion and subjecting the mixture to agitation or percussion or vibration to break down the emulsion, whereby the bituminous material is released in sufficient quantity to coat the pieces of the aggregate with a predetermined quantity of bitumen.

2. A process of making road material which consists in cleaning and drying an aggregate, covering the aggregate with a coating of volatile oil, mixing the so treated aggregate with an asphalt emulsion, subjecting the mix to sufficient agitation or percussion to break down the emulsion and separate the bitumen from the water, whereby the aggregate is coated with a predetermined quantity of bitumen, and then spraying into the mix a suitable filling material.

3. A process of making road material which consists in covering the particles of a substantially clean, dry aggregate with an oil, mixing the so treated aggregate with an asphalt emulsion, subjecting the mix to agitation or vibration to separate the bitumen from the water, whereby the aggregate is covered with a uniform coating of bitumen, spraying the coated particles of the aggregate with a filler blown into the mixer under fluid pressure and spraying a jet of steam into the mixer to further improve the uniformity of the mix.

4. A process of making road material which consists in covering the pieces of a substantially clean, dry aggregate with oil to render them waterproof, mixing the so treated particles with a cold asphalt emulsion, subjecting the mix to agitation or percussion in a mixer to separate the bitumen from the water of the emulsion, agitating the mixture to cover the pieces of aggregate with a uniform coating of the separated bitumen from the emulsion and then spraying the aggregate while in the mixer with a filler blown into the aggregate under steam pressure.

5. A process of making road material which consists in covering an aggregate with a suitable oil to waterproof same, mixing the waterproofed aggregate with an asphalt emulsion and subjecting the mix to agitation or vibration to separate the bitumen from the water, whereby the aggregate is coated with a substantially uniform coating of bitumen and then spraying a jet of steam into the mix to improve the uniformity of the material.

In witness whereof, we have hereunto set our hands.

FREDERICK OSCAR WARREN LOOMIS.
DANIEL MACKAY LOOMIS.